(12) United States Patent
Bell et al.

(10) Patent No.: US 11,182,273 B1
(45) Date of Patent: Nov. 23, 2021

(54) APPLICATION TESTING USING AUTOMATICALLY GENERATED TEST CASES

(71) Applicant: INTUIT INC., Mountain View, CA (US)

(72) Inventors: Chad Bell, San Diego, CA (US); Matthew Boulanger, San Diego, CA (US); Matthew Logston, San Diego, CA (US); Jesus Villegas, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 89 days.

(21) Appl. No.: 16/112,489

(22) Filed: Aug. 24, 2018

(51) Int. Cl.
  *G06F 11/36* (2006.01)
(52) U.S. Cl.
  CPC ........ *G06F 11/3676* (2013.01); *G06F 11/368* (2013.01); *G06F 11/3664* (2013.01); *G06F 11/3668* (2013.01); *G06F 11/3684* (2013.01); *G06F 11/3688* (2013.01)
(58) Field of Classification Search
  None
  See application file for complete search history.

(56) References Cited

U.S. PATENT DOCUMENTS

| | | | | |
|---|---|---|---|---|
| 2003/0084429 A1* | 5/2003 | Schaefer | ............ | G06F 11/3664 717/125 |
| 2007/0094543 A1* | 4/2007 | Joshi | ................... | G06F 11/3688 714/38.14 |
| 2008/0244322 A1* | 10/2008 | Kelso | .................. | G06F 11/3684 714/38.13 |
| 2010/0146420 A1* | 6/2010 | Bharadwaj | ............ | G06F 3/0481 715/764 |
| 2015/0301926 A1* | 10/2015 | Giannelos | ............. | G06F 3/0484 717/125 |
| 2017/0220458 A1* | 8/2017 | Finger | .................... | G06F 11/368 |
| 2018/0060222 A1* | 3/2018 | Kogan | ....................... | G06F 8/70 |
| 2018/0210817 A1* | 7/2018 | Kelly | ....................... | G06F 16/27 |
| 2019/0213116 A1* | 7/2019 | Kulkarni | ............. | G06F 11/3664 |
| 2019/0370156 A1* | 12/2019 | Kuner | ....................... | G06F 8/75 |

* cited by examiner

Primary Examiner — Lewis A Bullock, Jr.
Assistant Examiner — Mark A Gooray
(74) Attorney, Agent, or Firm — Patterson + Sheridan, LLP (57) ABSTRACT

Certain aspects of the present disclosure provide techniques for automating testing of applications. One example method generally includes obtaining a user interface (UI) source from an application defining pages of the application and fields associated with UI elements of each page of the pages and receiving a selection of a scenario. The method further includes generating scenario data based on a section of test data associated with the selection of the scenario and executing a test using the scenario data. To execute the test, the method includes identifying, by a runner, a first UI element of a first page of the application, identifying, by the runner, a first element of the scenario data mapped to the first UI element and entering, by the runner, the first element of the scenario data into the first UI element.

20 Claims, 6 Drawing Sheets

APPLICATION TESTING USING AUTOMATICALLY GENERATED TEST CASES

INTRODUCTION

Aspects of the present disclosure relate generally to software testing and in particular to automating aspects of software testing.

Software applications are typically tested by developers or dedicated testers before release to ensure that end-users have an experience that is as complete and error-free as possible. However, such testing can, depending on the type and specific nature of a software application, be time consuming, expensive and complicated. Simple automation may be employed in some circumstances to lessen some of these problems. For example a script may be employed to test a software application, which may reduce manual actions needed to be performed by a human developer or tester of the software application.

However, such simple automation may be of limited usefulness to the human tester. In particular, existing automation solutions may allow test cases to be generated and run repeatedly to prevent some manual action. However, existing automation solutions still require human testers to generate and maintain test cases. Additional test cases may be beneficial in testing the entirety of applications that have multiple paths or routes through the application. For example, if an application collects data from a user and proceeds through different sections of the application based on the data collected, a single test case would only test the sections of the application covered by that test case. Consequently, the human tester would still be required to create test cases for the application to ensure that all sections of the application are covered.

Further, as existing automation solutions rely on simple scripting, such solutions are unable to determine how much of the application is covered by a given test case. Instead, a human developer or tester is required to determine coverage of the test case manually.

Therefore, systems and methods are needed to facilitate automation of software testing that can generate test cases and calculate coverage of the test cases when executed.

BRIEF SUMMARY

Certain embodiments provide a method for automating testing of applications. The method generally includes obtaining a user interface (UI) source from an application defining pages of the application and fields associated with UI elements of each page of the pages and receiving a selection of a scenario. The method further includes generating scenario data based on a section of test data associated with the selection of the scenario and executing a test using the scenario data. To execute the test, the method includes identifying, by a runner, a first UI element of a first page of the application, identifying, by the runner, a first element of the scenario data mapped to the first UI element and entering, by the runner, the first element of the scenario data into the first UI element.

Other embodiments provide a computing system including a processor and a memory capable of executing the method for automating testing of applications described above. Still other embodiments provide computer-readable mediums capable of storing computer instructions, that when execute, perform the method for automating testing of applications described above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for facilitating automatic and comprehensive testing of applications.

Existing systems for automating the testing of applications still depend on human testers to generate and maintain tests or test cases, and are incapable of calculating coverage of the tests or test cases over the application. In order to automate application testing while avoiding the deficiencies of existing systems, a testing utility that generates and maintains test cases can be used. The testing may be performed on an application that consists of multiple paths defined by sets of pages that a user navigates through based on gathered user information (e.g., data input by the user). A complete testing of such an application may depend on fully testing all possible paths or routes through the pages of the application. A percentage or fraction of pages of the application as well as a percentage or fraction of the fields of the application covered by a particular test may be referred to as the coverage of that test for the application. The inability of existing systems to determine the coverage of a test is a deficiency of existing testing systems.

In general, the testing utility creates and maintains tests for a particular application. For example, the testing utility may receive a selection from a tester of a particular scenario of the application. A scenario is a subset of an application consisting of the parts of that application based on a particular topic. For example, in an application comprising a plurality of screens, a scenario may be all the screens of that application related to a particular topic, although not every user may see every screen of the scenario, and may not see the screens of the scenario in the same order as other users of the application. A particular scenario may include only a subset of the total set of pages of the application, or may specify a particular path through the pages of the application. The testing utility may then then begin the process of generating a test for the scenario. Based on the selection of the scenario, the testing utility identifies categories of data that can be used to test the scenario. The testing utility obtains test data from and selects particular elements of the test data to be used as scenario data for use in a test of the scenario. The sections of the test data not used as scenario data become seed data for the test.

The testing utility includes a runner used to execute the test. A runner is a software utility that can accept testing data as input and automatically complete a test of an application, or a subsection of the application, using the testing data. In general, the runner executes the test by accessing user interface (UI) source code that defines the application being tested. Because the runner interacts with the UI of an application, a different runner may be used for each version of an application using a different UI system. In some cases a UI source may be available separately from the application while in other cases the UI source may be part of non-separable source code. For the first page, the UI source defines fields and associated UI elements of the first page. The runner examines the UI source to identify the UI elements present on the first page. The runner then locates elements of the scenario data associated with the UI elements. The runner then interacts with the UI elements to enter the identified elements of the scenario data. Thereafter the runner may submit the entered data and proceed to the next page of the application, where the process of entering data may be repeated. As discussed, the application may have multiple pages; thus, executing a test of such an application may involve navigation through multiple pages. Upon successful submission of the first page, the application may transmit code underlying a second page. After entering scenario data into the UI elements of the second page, the runner may submit the second page. Successful submission of the second page may lead to the application transmitting a third application page, and so on.

The application may navigate through different routes based on information entered into the fields of the application. For example, the application may proceed through different sets of pages based on information collected from a user. During a test, the application proceeds through different sets of pages based on information entered by the runner. One aspect of testing is verifying that a test covers all pages of the application and all elements of those pages. Coverage of the test over the application (e.g., the fraction of pages and elements of pages accessed during the test) may be used to evaluate the effectiveness of the test.

The testing utility also includes the ability to maintain test cases, rather than simply execute tests using the test cases. For example, in current testing systems, a human tester may need to update the stored test cases (or make entirely new test cases) when the application testing by the test cases is itself updated. During certain stages of application development, such updating may occur frequently. By automatically maintaining test cases, the testing utility can re-use test cases created for one version of an application with a subsequently updated version of the application. This is possible as the testing utility interacts with the UI of the application directly and does not operate on hard-coded matches between data and UI elements, thus the testing utility can interact with the UI of the updated version of the application in the same manner as it interacts with the UI of the application before updating.

Figure 1:
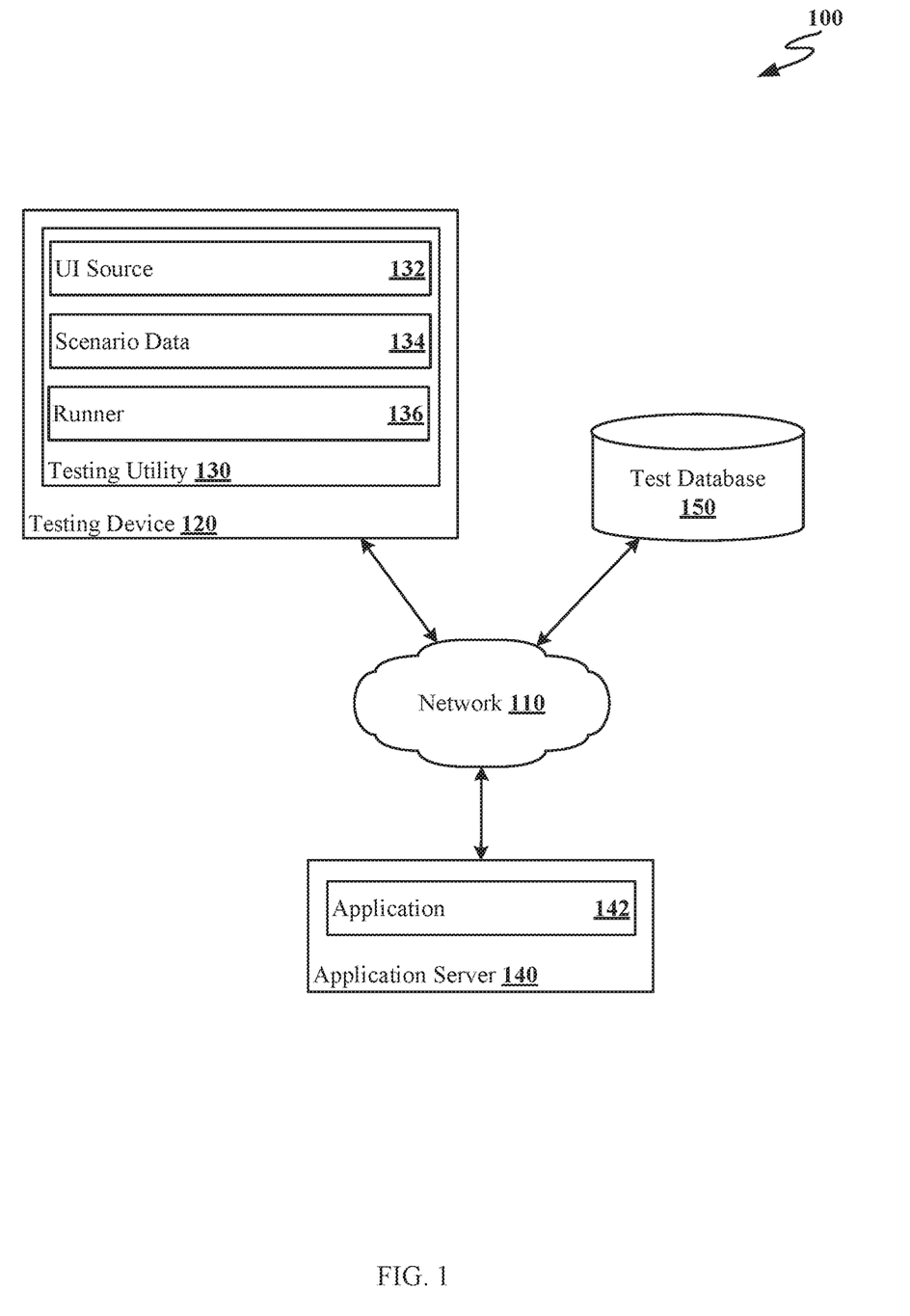
FIG. 1 shows an example computing environment for automatically testing an application.

FIG. 1 shows an example computing environment 100 for automatically testing an application. As shown, computing environment 100 includes testing device 120, application server 140, and test database 150 all in communication via network 110. Although shown as a single device, in other embodiments the functions of testing device 120 may be performed by a multiple computing devices or using a distributed or cloud computing system. Further, in other embodiments the functions of test database 150 may be performed by a storage device resident on testing device 120 or may be performed by a storage device directly linked to testing device 120, rather than available over network 110.

Testing device 120 is a computing device comprising a processor and a memory capable of executing various computer-executable instructions, such as software applications or utilities. Testing device 120 includes testing utility 130. Testing utility 130 is a software application executing on testing device 120 used to test applications. In this example, testing utility 130 is used to test application 142 executing on application server 140. Testing utility 130 includes various modules and data, including UI source 132, scenario data 134 and runner 136.

UI source 132 is source code defining application 142 and may be obtained from application server 140 over network 110. UI source 132 may be used to determine the number of pages of application 142. UI source 132 further defines the UI elements present on each page of application 142. Knowledge of the UI elements of application 142 can be used to prepare scenario data 134, which is entered into the UI elements of application 142 to complete a test.

Testing utility 130 creates scenario data 134 based on a scenario specified by a human tester. Testing utility 130 uses the specified scenario to select parts of test data to use in a test of the specified scenario. In this example, testing utility 130 obtains the test data from test database 150 via network 110. The test data of test database 150 may be generated by a human tester to cover a wide range of possible data entries for application 142. In other embodiments, the test data may be sanitized data obtained from actual executions of application 142 by end-users. For example, when an end-user executes application 142, the data entered by the end-user may be sanitized (e.g., personally identifiable information may be removed from the data) or otherwise edited for use and then stored in test database 150. A detailed example of test data is described below with respect to FIG. 2.

Scenario data 134 is generated by testing utility 130 from a subset of the test data based on the specified scenario. Scenario data 134 is used to test a particular scenario of application 142. In general, scenario data 134 includes data to be entered into UI elements of application 142 that appear on pages of application 142 associated with a particular scenario. For example, in a tax preparation application, one scenario may be a series of pages related to eligibility to obtain a mortgage credit certificate. In that example, scenario data 134 includes data sufficient to complete the pages related to the mortgage credit certificate, which includes income and a state of residence, among other information. A detailed example of scenario data 134 is described below with respect to FIG. 2.

Runner 136 is used to perform a test of application 142. In some embodiments, other runners similar to runner 136 may be present on testing device 120. Such other runners may be useful if different versions of application 142 exist to be tested. For example, different versions of application 142 may be made using different software frameworks. A software framework is one or more libraries as well as custom code of a programming language used to create a given application. Software frameworks may be purpose-built for a given application or may be substantially re-usable for different applications. For example, React is a general-purpose user interface software framework for the programming language JavaScript. If different versions of application 142 were made using different software frameworks, multiple runners may be used to test the different versions of application 142.

In general, to execute a test, runner 136 analyzes a page of application 142 to identify UI elements. To do so, runner 136 accesses UI source 132 and inspects individual UI elements of UI source 132. Runner 136 then checks scenario data 134 to determine if scenario data 134 includes a data element corresponding to the individual UI element. Runner 136 then obtains the data element to fill the UI elements, and enters the elements of scenario data 134 into the individual UI element. Runner 136 performs the same process for each UI element of the first page of application 142. Runner 136 then submits the first page of application 142. Application 142 then proceeds to a next page, and runner 136 repeats the steps of identifying UI elements, obtaining data, and entering data to test the application.

Application server 140 is a computing device comprising a processor and a memory capable of executing computer-executable instructions, such as various software applications or utilities. Application server 140 executes application 142 and may make application 142 available to client devices (not shown) over network 110. In this example, testing device 120 acts a client device to access application 142. Application 142 may be a web-based application available to client devices through a web browser. In the case of a web-based application, UI source 132 may be a hypertext markup language (HTML) document transmitted from application server 140 to testing device 120. In other embodiments, application 142 may be a native application running directly on a computing device, such as testing device 120. If so, UI source 132 may be part of the source code of application 142 made accessible to testing utility 130.

In order to automatically test application 142, testing utility 130 first obtains UI source 132 from application 142 over network 110. After obtaining UI source 132, testing utility 130 generates scenario data 134 based on a scenario specified by a human tester. Then, testing utility 130 obtains test data from test database 150 over network 110 and creates scenario data 134 from a subset of the test data. Scenario data 134 constitutes data that can be used to execute a test of application 142. Thereafter, testing utility 130 transfers scenario data 134 to runner 136. Runner 136 then uses scenario data 134 to execute a test or a plurality of tests using scenario data 134.

After receiving a selection of a scenario, a testing utility is able to generate and execute tests of an application with no additional input from a human tester. This is in contrast to existing testing systems, where a human tester is required to generate data formatted for a particular test, such as scenario data 134 above. Such human involvement in the testing process not only results in additional time spent to test an application, but introduces the possibility of human input errors in the testing process. The current methods and systems do not require human creation or generation of tests, and thus run more quickly, more efficiently and with less risk of error than existing testing systems.

Figure 2:
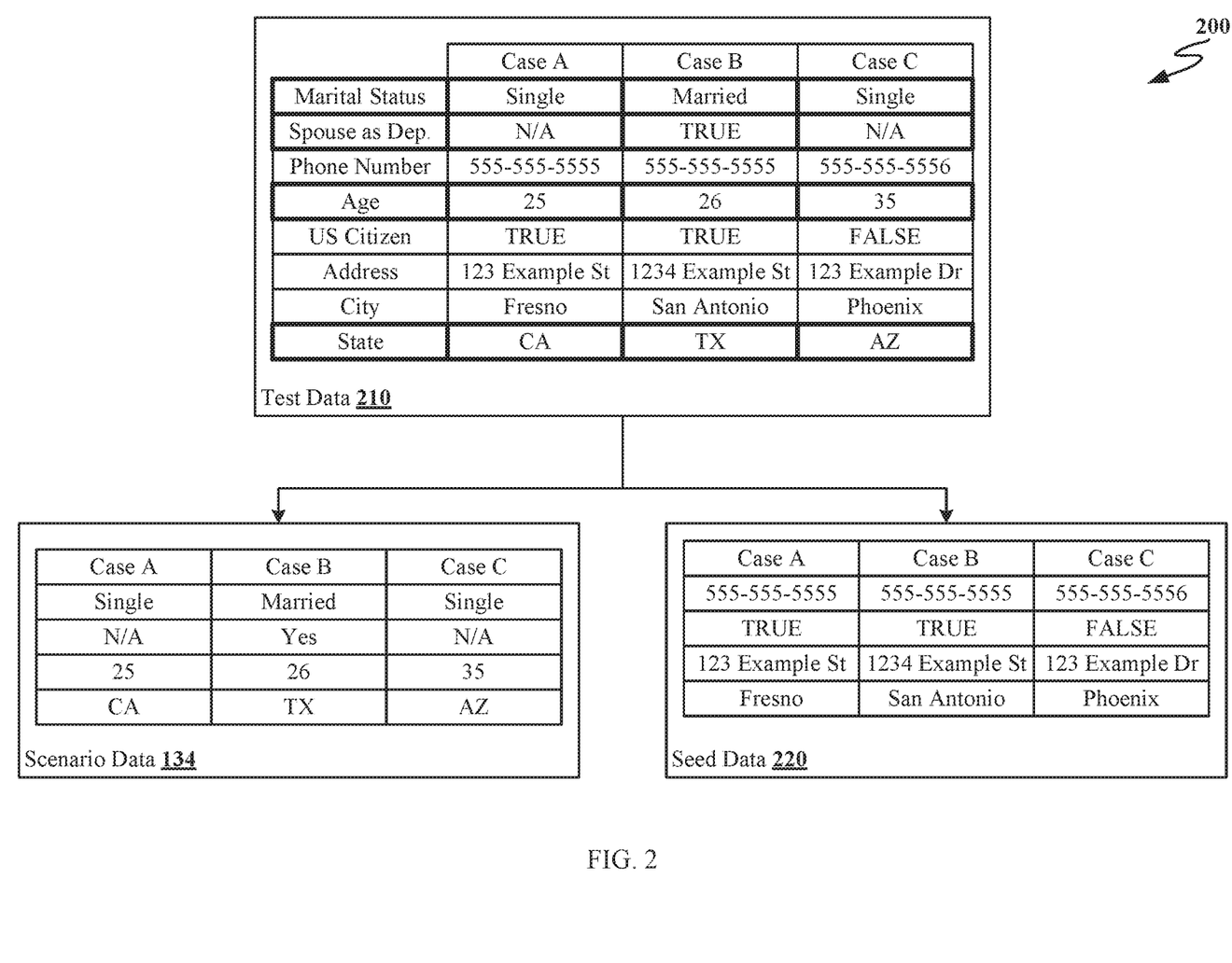
FIG. 2 is a conceptual illustration of the generation of scenario data for testing an application.

FIG. 2 is a conceptual illustration of a process 200 for the generation of scenario data 134 for testing an application. Process 200 includes test data 210, scenario data 134 and seed data 220. Test data 210 is a simplified example of test data for use in testing an application. As shown, test data 210 includes ten categories of data across three test cases A-C, but in practice test data may include additional categories of data and test cases. In general, test data 210 can be used to test the entirety of an application, although only certain parts of test data 210 may be needed to test an individual scenario of the application.

A testing utility, such as testing utility 130 of FIG. 1, creates scenario data 134 based on a specified scenario. Scenario data 134 includes only the categories of data used in testing the specified scenario. This data is still maintained across three test cases A-C. However, as illustrated, each test case has been limited to the four categories of "Marital Status," "Spouse as Dependent," "Age" and "State." In this example, those four categories are the data needed to test the pages of the application comprising the specified scenario.

Seed data 220 is the remainder of test data 210 without scenario data 134. In general, seed data is data used to instantiate or prepare a scenario of an application for testing, but which is not used in the actual testing of the scenario. Seed data may be used when parts of the scenario being tested depend on or must agree with other sections of the application. In this simplified example, seed data 220 also includes four categories of data, specifically "Phone Number," "US Citizen," "Address" and "City." In practice, seed data 220 may include many additional data elements. In the example of a tax preparation application, information entered on an early page of the tax preparation application (such as income) may be used to compute figures later on in the tax preparation application. As a result, income may be part of seed data 220 used in testing scenarios which include income-related information. In this example, the categories of data comprising seed data 220 may be used to seed the test of the specified scenario.

Figure 3:
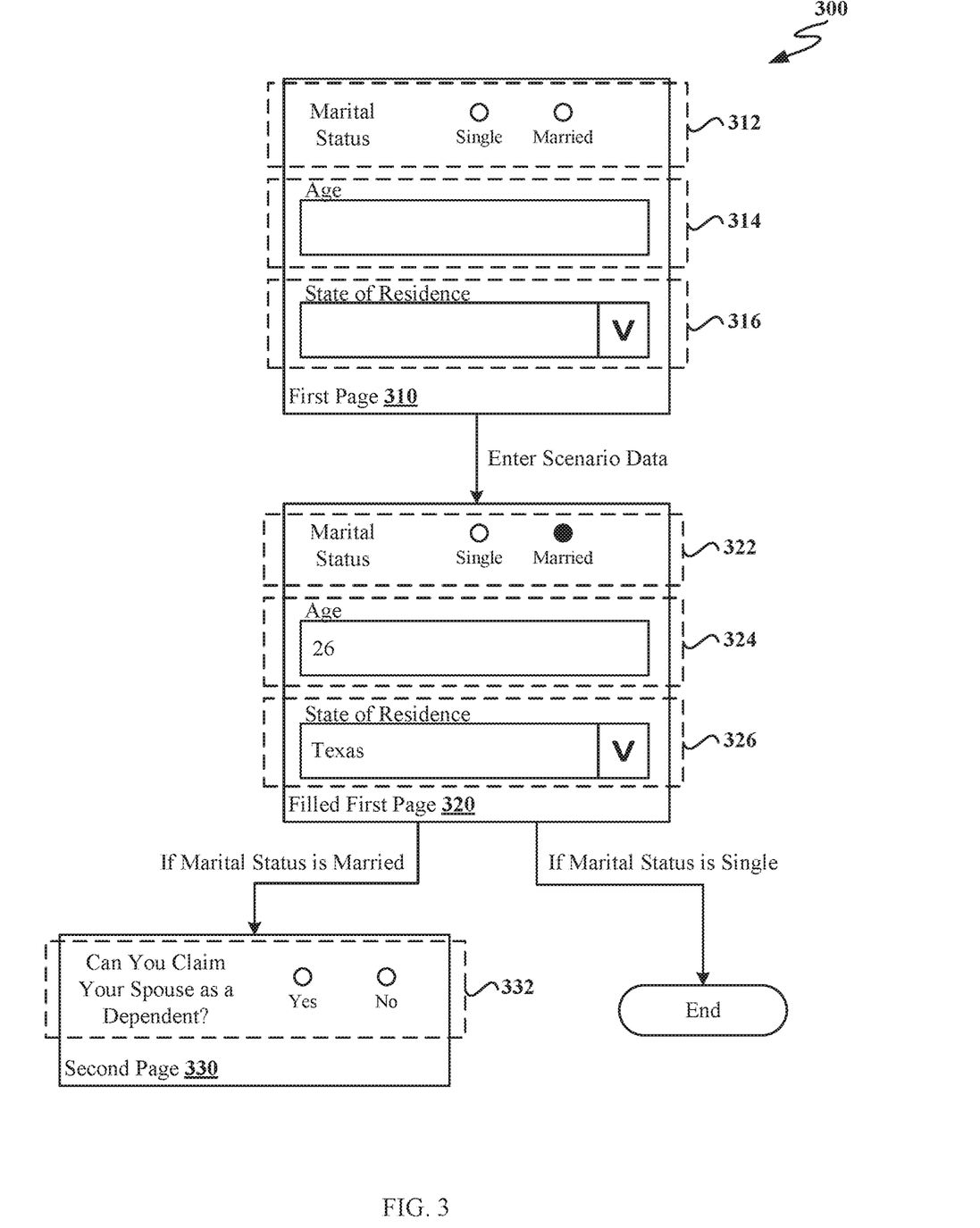
FIG. 3 depicts a simplified example of entering data into an application.

FIG. 3 depicts a process 300 of entering data into an application. Process 300 includes first page 310, filled first page 320 and second page 330. First page 310 includes three UI elements 312, 314 and 316. UI element 312 is a radio button UI element for the data "Marital Status" with two choices: "Single" and "Married." UI element 314 is a text box UI element for the data "Age." UI element 316 is a drop-down menu UI element for the data "State of Residence."

As shown, scenario data is entered into first page 310 by a runner leading to filled first page 320. Filled first page 320 also includes three UI elements. UI element 322 is the radio button UI element that has had "Married" selected by the runner. UI element 324 is the text box element that has had the string "26" entered by the runner. UI element 326 is the drop down menu that has had "Texas" selected by the runner. In this example, the scenario data used is scenario data 134 of FIG. 2. Referring back to FIG. 2, scenario data 134 includes four categories of data. Three of those categories are shown as entered into filled first page 320: "Marital Status," "Age" and "State." In particular, the data from Test Case B is shown in filled first page 320.

The fourth category of data of scenario data 134 is only used depending on data entered on first page 310. In particular, second page 330 accepts input relating to the category "Spouse as Dependent," at UI element 332, which is a radio button UI element. Second page 330 is only accessed if, as shown, UI element 322 is entered with "Married." Because Test Case B includes the data "Married" for "Martial Status," when Test Case B is executed, the application proceeds to second page 330. For other test cases which include the data "Single" for "Marital Status," such as Test Case A, second page 330 is not accessed and instead, as shown, the testing for the scenario is complete.

Figure 4:
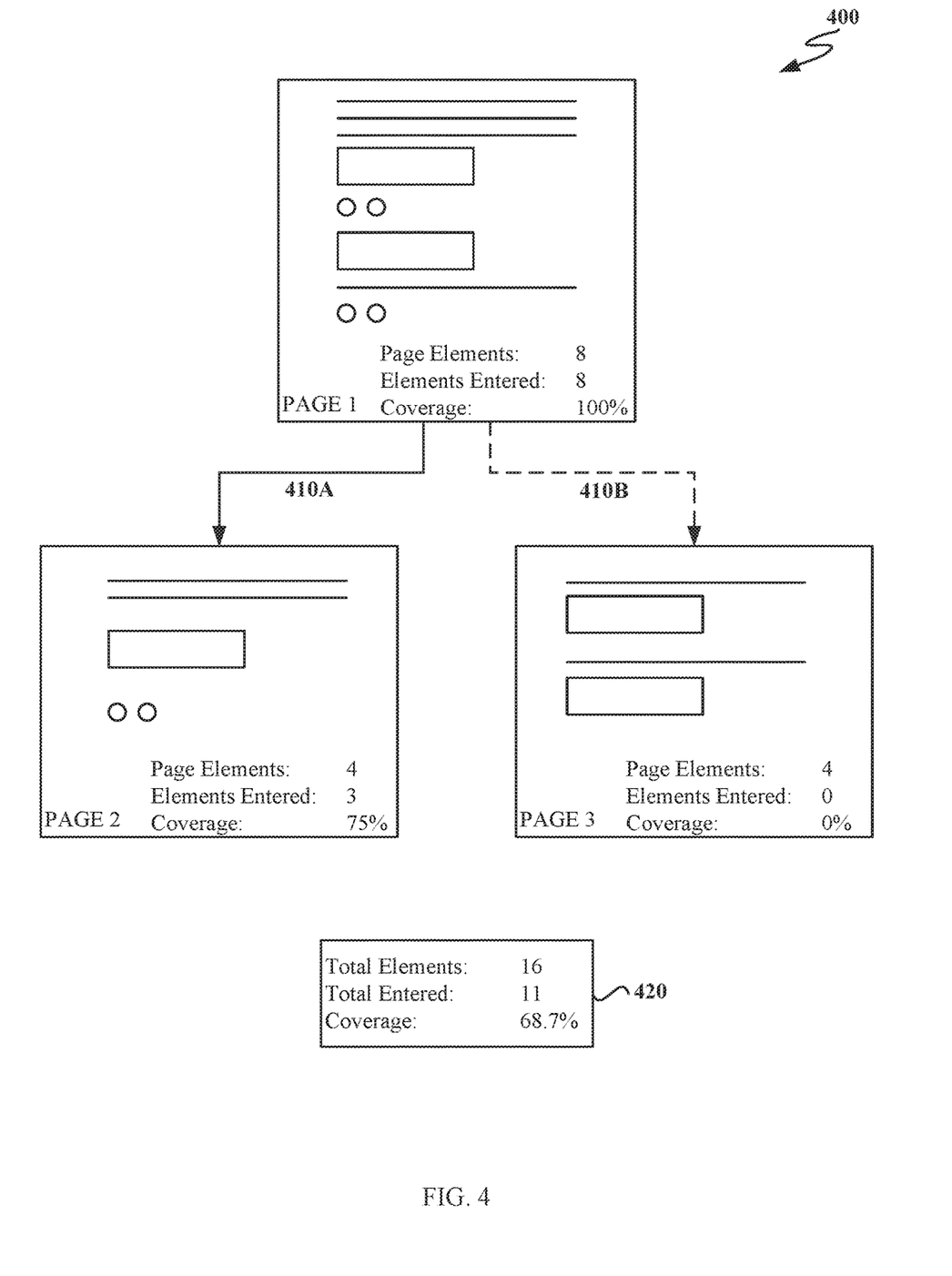
FIG. 4 is a conceptual illustration of coverage of an application based on particular scenario data.

FIG. 4 is a conceptual illustration of a process 400 for determining the coverage of an application for an executed test. Process 400 includes an example scenario of an application including five pages. As discussed herein, a testing utility and a runner can be used to execute a test of the application using scenario data. The illustrated scenario starts with page 1, and proceeds to either page 2 or page 3 depending on data entered into page 1. In this example, data entered into page 1 causes the application to navigate from page 1 to page 2, as shown at sequence 410A.

As the test is executed, coverage is calculated for each page. In particular, page 1 includes eight UI elements and the test identified and entered data into all eight UI elements present on page 1. Thus, the coverage for page 1 by this test is 100%. Page 2 includes four UI elements and the test identified and entered data into three of the four UI elements. Thus, the coverage for page 2 by this test is 75%.

Coverage may be calculated by a testing utility with access to the UI source of an application. For example, as discussed above with respect to FIG. 1, a testing utility may access the UI source of the application to test the application. The UI source may be further used to calculate coverage. For example, the UI source defines the number of UI elements of each page of an application. While executing a test, a runner may track the number of UI elements entered on each page and produce a test report including the total number of UI elements entered. By comparing the UI source (including total UI elements of the scenario) with the test report (including UI elements entered) the testing utility can determine what fraction of UI elements successfully had data entered during the test.

While the coverage for the three pages accessed by the test (pages 1 and 2) is cumulatively eleven UI elements entered out of twelve UI elements total, this may not indicate a complete picture of coverage for the entire scenario tested, as the scenario also includes page 3. Consequently, coverage of the test over this scenario includes the UI elements of page 3. As shown in coverage report 420, pages 1-3 include a total of sixteen UI elements and the test as executed identified and entered eleven UI elements total for a total coverage of 68.7%. In some cases, it may not be possible to navigate through all pages associated with a scenario, and so 100% coverage for the scenario may not be possible with a single set of scenario data or a single test case.

In this circumstance, 68.7% coverage may be a low enough value to indicate that the scenario has not been sufficiently tested. In order to obtain greater coverage, a set of scenario data may be prepared such that the application navigates to page 3. As shown at sequence 410B, the application may navigate from page 1 to page 3 depending on data entered into page 1.

Coverage is a useful metric when assessing the sufficiency of a test of an application. In particular, low coverage indicates that the test does not include enough aspects of the application to consider the test complete. Existing testing systems lack the ability to calculate coverage of a test. Rather, existing testing systems merely execute a sequence of inputs given by a human tester. The present disclosure describes systems and methods which can calculate the coverage of a test effectively, which saves human time in calculating coverage. Automatically calculated coverage may also improve the testing process by indicating when an application may benefit from additional testing. Further, if the data used to test an application is pulled from actual user data, coverage may indicate which sections of an application are not frequently used by actual users. Thus, development of the application may be directed by coverage reports that indicate the most frequently and least frequently used sections of the application.

Figure 5:
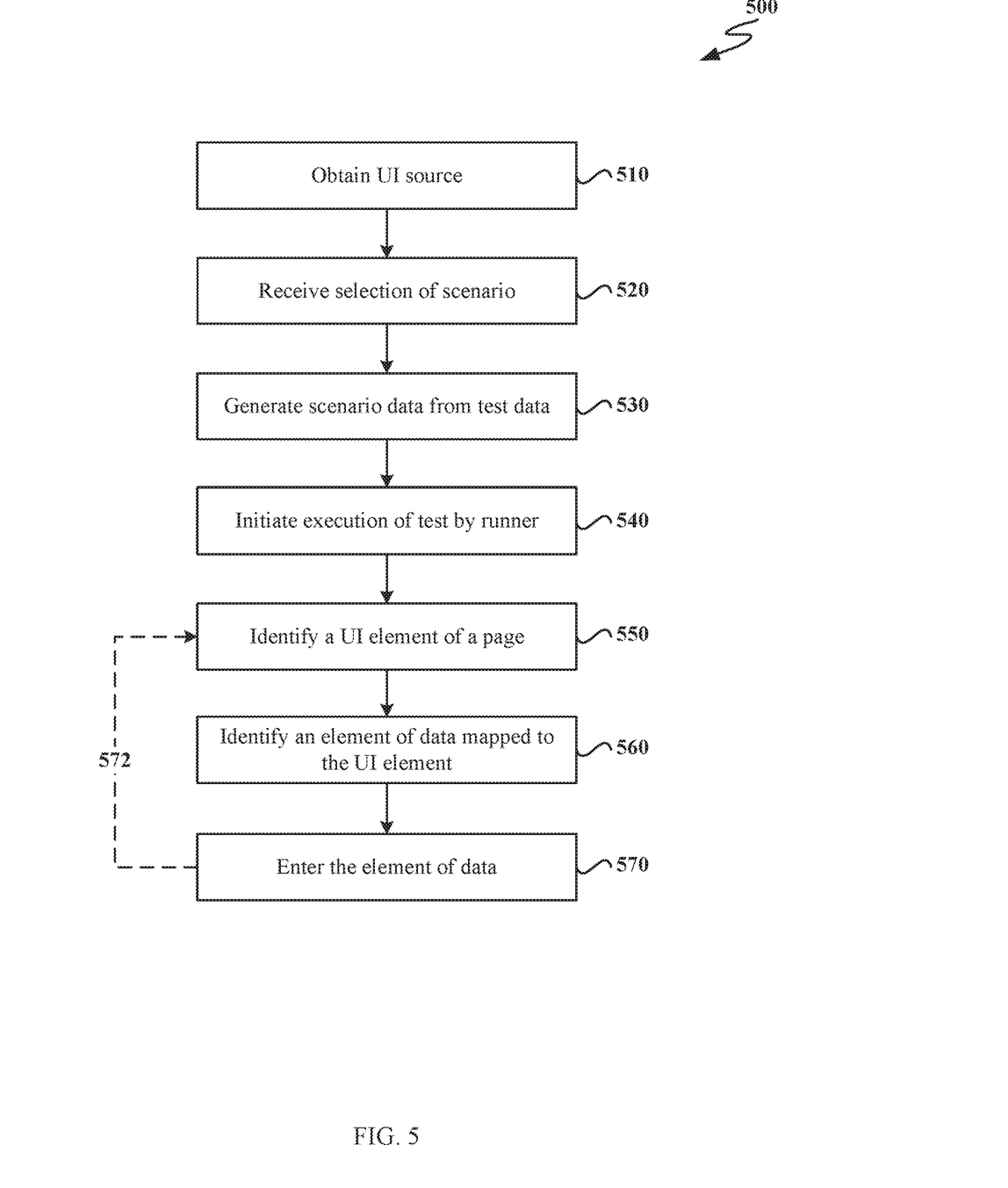
FIG. 5 is a flow diagram of an example method for automating testing of an application.

FIG. 5 is a flow diagram of an example method 500 for automating testing of an application. Method 500 may be performed by software executing on a testing device such as testing device 120 of FIG. 1. The software executing on the testing device may include a testing utility and a runner such as testing utility 130 and runner 144 of FIG. 1. Method 500 begins at step 510, where the testing utility obtains the UI source of the application to be tested. The UI source may be available from the application over a network connection. A copy of the UI source may be stored on the testing device for using by the testing utility. In general, the UI source defines the UI elements of the application and the location of those UI elements in the pages of the application.

Method 500 then proceeds to step 520, where the testing utility receives a selection of a scenario to test. The selection of the scenario may be received from a user of the testing utility such as a human tester of the application. The application consists of multiple scenarios for gathering and processing different data. In the example of a tax processing application, scenarios might process information related to different tax-related topics, such as available tax credits or deductions.

Method 500 then proceeds to step 530, where the testing utility generates scenario data from test data. The test data is obtained by the testing utility over a network connection from a testing database. The test data may be obtained from data collected by a version of the application available to end-users, and thus the test data may reflect actual information entered by users of the application. In general, the scenario data is a subset of the test data pared down to the categories of data needed to test the specified scenario of the application. The testing utility identifies the elements of the test data needed to complete the specified scenario and selects those elements of the test data to generate the scenario data. After the scenario data is generated, the testing utility makes the scenario data available to the runner. If the testing utility and the runner are executing on separate devices, the testing utility may transfer the scenario data to the runner over a network connection.

Method 500 then proceeds to step 540, where the runner initiates execution of a test using the scenario data. To execute a test, the runner accesses the UI source of the application and the scenario data generated at step 530. Steps 550, 560 and 570 comprise the process for executing the test as initiated in step 540. At step 572, steps 550, 560 and 570 may be repeated for additional UI elements of the first page. Further, this process may be completed for every page of the application. At step 550, the runner identifies a first UI element of a first page of the application. In general, the runner interacts with the application in the same manner a human user of the application would. If the application is a web-based application accessed using a web browser, the runner will complete the fields of the application by entering data through the web browser. The runner accomplishes this by directly interfacing with the UI source defining the application as it appears in the web browser. For example, the UI source may be an HTML file and the runner may be capable of editing the HTML file or creating an HTML response file for transmission to the application. The runner is capable of determining that a particular UI element (as defined in the UI source) does not accept input formatted as text and performing an action to complete that particular UI element (such as generating an HTML response file that includes a selection of the particular UI element). The runner is capable of identifying, via the UI source defining the first page, the UI elements of the first page.

At step 560, the runner identifies a data element of the scenario data that is mapped to the first UI element. The first UI element, once identified can be connected to a particular element of the scenario data corresponding to the category of data accepted by the first UI element. If the first UI element accepts phone numbers formatted as text, for example, the runner identifies a phone number stored in the scenario data.

At step 570, the runner enters the data element identified at step 560 into the first UI element. Depending on the type of UI element, this entrance may include various actions. For example, if the first UI element is a text box, entry of data may include inputting text into the text box. If the first UI element is a set of radio buttons, entry of data may include selecting one of the radio buttons. Other types of data entry are possible for other types of UI elements.

In some embodiments method 500 further includes determining, based on executing the test, a coverage metric of the test, wherein the coverage metric is based on a fraction of the pages and a fraction of the fields accessed during execution of the test. Method 500 may further include generating a report of the coverage metric of the test. As discussed above with respect to FIG. 4, coverage may be calculated by the testing utility by comparing a test report generated by the runner to the application data.

When calculating coverage, method 500 may further include determining, based on the coverage metric, that sections of the application are not covered by the test data. Such a determination may indicate that the sections not covered by the test data are infrequently used by end-users of the application, if the test data is based on actual end-user data. In some embodiments of method 500, the report of the coverage metric includes the number of pages, buttons and fields of the application that were missed by the test.

In some embodiments, method 500 further includes generating seed data based on a remaining section of the test data and entering the seed data into seed fields of the application, wherein the seed fields are associated with data related to other scenarios of the application.

In order to execute an application test, method 500 may further include, in some embodiments, the steps of determining the scenario includes a route through the pages of the application and executing the test by following the route through the pages of the application. In general a scenario may define a route through the pages of the application, so executing a test of the scenario may involve visiting each page defined in the route, that is, following the route through the pages.

In some embodiments, method 500 further includes determining the application has been updated; and executing an updated test with the scenario data used in the test. In general, an update to the application does not prevent the same data used to the application before update from being used to update the updated version of the application. This can be done without any additional input from the human tester and without altering the scenario data before use.

Figure 6:
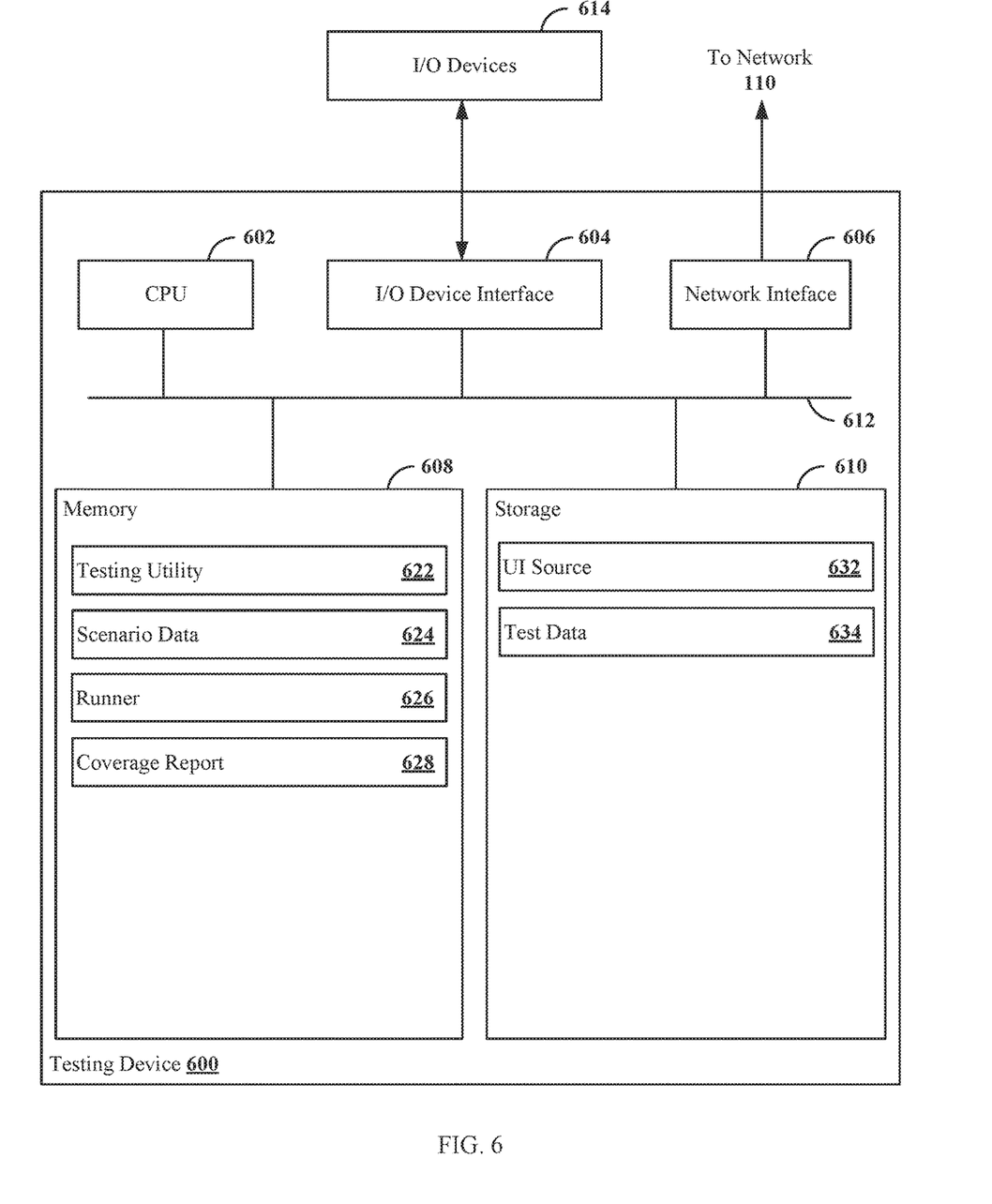
FIG. 6 depicts an example testing device.

FIG. 6 depicts an example testing device 600, such as testing device 120 of FIG. 1. As shown, the testing device 600 includes, without limitation, a central processing unit (CPU) 602, one or more input/output (I/O) device interfaces 604, which may allow for the connection of various I/O devices 614 (e.g., keyboards, displays, mouse devices, pen input, etc.) to testing device 600, network interface 606, memory 608, storage 610, and an interconnect 612.

The CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. The CPU 602 is included to be representative of a single CPU, multiple CPUs, a single CPU having multiple processing cores, and the like. The I/O device interface 604 may provide an interface for capturing data from one or more input devices integrated into or connected to the testing device 600, such as keyboards, mice, touchscreens, and so on. The memory 608 may represent a random access memory (RAM), while the storage 610 may be a solid state drive, for example. Although shown as a single unit, the storage 610 may be a combination of fixed and/or removable storage devices, such as fixed drives, removable memory cards, network attached storage (NAS), or cloud-based storage.

As shown, the memory 608 includes testing utility 622, scenario data 624, runner 626 and coverage report 628. Scenario data 624 is generated by testing utility 622 based on test data 634 and used perform tests of an application by runner 626. Coverage report 628 is a report of the coverage of the test over the application prepared by runner 626. Testing utility 622 and runner 626 are applications executed based on instructions stored in the storage 610. Such instructions may be executed by the CPU 602. Scenario data 624 and coverage report 628 are data temporarily resident in memory 608.

As shown, the storage 610 includes application data 632, test data 634 and mappings 636. Application data 632 is a data structure storing data relating to the UI elements of the application to be tested. Test data 634 is data used to test the application as whole, which can be filtered down to scenario data 624 for use in testing particular scenarios of the application. Mappings 636 are associations between the UI elements defined in application data 632 and elements of test data 634.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automating testing of an application, comprising:
   obtaining a user interface (UI) source from the application defining a plurality of pages of the application and UI elements of each page of the plurality of pages;
   receiving a selection of a scenario comprising a first subset of pages of the plurality of pages of the application that relate to a given topic;
   generating test data comprising scenario data and seed data associated with the selection of the scenario, wherein the test data was entered by one or more users of the application during one or more previous executions of the application and has been sanitized by removing personally identifiable information, wherein the scenario data is a subset of the test data comprising scenario elements needed to test the selected scenario of the application by following a first route through the first subset of pages, and the seed data is a remainder of the test data associated with the selected scenario that is entered by a user;
   executing a first test of the selected scenario by following the first route through the first subset of pages using the scenario data and seed data, wherein executing the first test comprises:
      identifying, by a runner, a first UI element of a plurality of UI elements of the first subset of pages, wherein the first UI element is located on a first page of the first subset of pages;
      identifying, by the runner, a second UI element that is not on the first page and that relates to the first UI element, wherein a scenario element of the scenario data depends on the second UI element;
      entering, by the runner, seed data into the second UI element that is not on the first page;
      determining that the scenario element of the scenario data is mapped to the first UI element;
      entering, by the runner, the scenario element of the scenario data into the first UI element; and
      entering, by the runner, additional scenario elements of the scenario data into remaining UI elements of the plurality of UI elements;
   determining, by the runner during execution of the first test, a first coverage metric of the first test, wherein the first coverage metric is based on a fraction of the pages accessed and a fraction of the UI elements accessed during execution of the first test;
   determining that the first coverage metric does not reach a coverage threshold;
   generating updated scenario data, wherein the updated scenario data comprises scenario elements needed to execute a second test of the selected scenario by following a second route, different from the first route, through the first subset of pages; and
   determining, after executing the second test, that a second coverage metric of the second test reaches the coverage threshold.

2. The method of claim 1, further comprising generating a coverage report based on a plurality of coverage metrics of a plurality of tests including the second coverage metric of the second test.

3. The method of claim 1, further comprising determining, based on the first coverage metric, sections of the application not covered by the scenario data.

4. The method of claim 2, wherein the coverage report includes pages, buttons and fields of the application missed by the first test.

5. The method of claim 1, wherein the scenario data is obtained from a plurality of previous users of the application.

6. The method of claim 1, wherein executing the first test further comprises:
   determining, by the runner, the first UI element of the plurality of UI elements does not accept input formatted as text; and
   performing, by the runner, an action to complete the first UI element.

7. The method of claim 2, further comprising determining, based on the coverage report, a most frequently accessed page of test data and a most frequently accessed UI element of test data.

8. The method of claim 1, further comprising:
   determining the application has been updated; and
   executing an updated test with the scenario data used in the first test.

9. A computing device, comprising:
   a memory including computer executable instructions; and
   a processor configured to execute the computer executable instructions and cause the computing device to:
      obtain a user interface (UI) source from an application defining a plurality of pages of the application and UI elements of each page of the plurality of pages;
      receive a selection of a scenario comprising a first subset of pages of the plurality of pages of the application that relate to a given topic;
      generate test data comprising scenario data and seed data associated with the selection of the scenario, wherein the test data was entered by one or more users of the application during one or more previous executions of the application and has been sanitized by removing personally identifiable information, wherein the scenario data is a subset of the test data comprising scenario elements needed to test the selected scenario of the application by following a first route through the first subset of pages, and the seed data is a remainder of the test data associated with the selected scenario that is entered by a user;
      execute a first test of the selected scenario by following the first route through the first subset of pages using the scenario data and seed data, wherein processor being configured to cause the computing device to execute the first test comprises the processor being configured to cause the computing device to:
         identify, by a runner, a first UI element of a plurality of UI elements of the first subset of pages, wherein the first UI element is located on a first page of the first subset of pages;
         identify, by the runner, a second UI element that is not on the first page and that relates to the first UI element, wherein a scenario element of the scenario data depends on the second UL element;
         enter, by the runner, seed data into the second UI element that is not on the first page;
         determine that the scenario element of the scenario data is mapped to the first UI element;
         enter, by the runner, the scenario element of the scenario data into the first UI elements; and
         enter, by the runner, additional scenario elements of the scenario data into remaining UI elements of the plurality of UI elements;
      determine, by the runner during execution of the first test, a first coverage metric of the first test, wherein the first coverage metric is based on a fraction of the pages accessed and a fraction of the UI elements accessed during execution of the first test;

determine that the first coverage metric does not reach a coverage threshold;

generate updated scenario data, wherein the updated scenario data comprises scenario elements needed to execute a second test of the selected scenario by following a second route, different from the first route, through the first subset of pages; and determine, after executing the second test, that a second coverage metric of the second test reaches the coverage threshold.

10. The computing device of claim 9, wherein the processor is further configured to cause the computing device to generate a coverage report based on a plurality of coverage metrics of a plurality of tests including the second coverage metric of the second test.

11. The computing device of claim 9, wherein the processor is further configured to cause the computing device to determine, based on the first coverage metric, sections of the application not covered by the scenario data.

12. The computing device of claim 10, wherein the coverage report includes pages, buttons and fields of the application missed by the first test.

13. The computing device of claim 9, wherein the scenario data is obtained from a plurality of previous users of the application.

14. The computing device of claim 9, wherein the processor being configured to cause the computing device to execute the first test further comprises the processor being configured to cause the computing device to:

determine, by the runner, the first UI element of the plurality of UI elements does not accept input formatted as text; and perform, by the runner, an action to complete the first UI element.

15. The computing device of claim 10, wherein the processor is further configured to cause the computing device to determine, based on the coverage report, a most frequently accessed page of test data and a most frequently accessed UI element of test data.

16. The computing device of claim 9, wherein the processor is further configured to cause the computing device to:

determining the application has been updated; and executing an updated test with the scenario data used in the first test.

17. A computing device for automating testing of an application, comprising:

means for obtaining a user interface (UI) source from the application defining a plurality of pages of the application and UI elements of each page of the plurality of pages;

means for receiving a selection of a scenario comprising a first subset of pages of the plurality of pages of the application that relate to a given topic;

means for generating test data comprising scenario data and seed data associated with the selection of the scenario, wherein the test data was entered by one or more users of the application during one or more previous executions of the application and has been sanitized by removing personally identifiable information, wherein the scenario data is a subset of the test data comprising scenario elements needed to test the selected scenario of the application by following a first route through the first subset of pages, and the seed data is a remainder of the test data associated with the selected scenario that is entered by a user;

means for executing a first test of the selected scenario by following the first route through the first subset of pages using the scenario data and seed data, wherein the means for executing the first test comprise:

means for identifying, by a runner, including a first UI element of a plurality of UI elements of the first subset of pages, wherein the first UI element is located on a first page of the first subset of pages;

means for identifying, by the runner, a second UI element that is not on the first page and that relates to the first UI element, wherein a scenario element of the scenario data depends on the second UI;

means for entering, by the runner, seed data into the second UI element that is not on the first page;

means for determining that the scenario element of the scenario data is mapped to the first UI element;

means for entering, by the runner, the scenario element of the scenario data into the first UI element; and means for entering, by the runner, additionally scenario elements of the scenario data into remaining UI elements of the plurality of the UI elements;

means for determining, by the runner during execution of the first test, a first coverage metric of the first test, wherein the first coverage metric is based on a fraction of the pages accessed and a fraction of the UI elements accessed during execution of the first test;

means for determining that the first coverage metric does not reach a coverage threshold;

means for generating updated scenario data, wherein the updated scenario data comprises scenario elements needed to execute a second test of the selected scenario by following a second route, different from the first route, through the first subset of pages; and determining, after executing the second test, that a second coverage metric of the second test reaches the coverage threshold.

18. The computing device of claim 17, further comprising means for generating a coverage report based on a plurality of coverage metrics of a plurality of tests including the second coverage metric of the second test.

19. The computing device of claim 18, further comprising means for determining, based on the coverage report, a most frequently accessed page of test data and a most frequently accessed UI element of test data.

20. The computing device of claim 17, further comprising means for determining, based on the first coverage metric, sections of the application not covered by the scenario data.

* * * * *